US012730245B2

(12) United States Patent
Cornish et al.

(10) Patent No.: US 12,730,245 B2
(45) Date of Patent: Sep. 8, 2026

(54) DEVICES, SYSTEMS, AND METHODS FOR CATCHING PROJECTILES

(71) Applicant: Nott Company, Arden Hills, MN (US)

(72) Inventors: Robert Cornish, Coon Rapids, MN (US); Mathew McConkey, Annandale, MN (US); Dusten Carl O'Konek, Jr., Henderson, MN (US); Justin D. York, Apple Valley, MN (US)

(73) Assignee: Nott Company, Arden Hills, MN (US)

( * ) Notice: Subject to any disclaimer, the term of this patent is extended or adjusted under 35 U.S.C. 154(b) by 109 days.

(21) Appl. No.: 18/587,567

(22) Filed: Feb. 26, 2024

(65) Prior Publication Data

US 2025/0271588 A1 Aug. 28, 2025

(51) Int. Cl.
*G01V 8/12* (2006.01)
*F16L 55/24* (2006.01)

(52) U.S. Cl.
CPC ................ *G01V 8/12* (2013.01); *F16L 55/24* (2013.01)

(58) Field of Classification Search
CPC . F28G 1/12; F28G 1/125; B08B 9/053; B08B 9/055; B08B 9/0551; B08B 9/0552; B08B 9/0553; B08B 9/0554; B08B 9/057
See application file for complete search history.

(56) References Cited

U.S. PATENT DOCUMENTS 5,444,886 A * 8/1995 Takashina ............... F16L 55/46 15/104.062
5,997,500 A * 12/1999 Cook ................ A61M 37/0069 604/141
7,996,946 B1 * 8/2011 Riley ........................ F28G 1/12 165/95
2012/0282853 A1 * 11/2012 Sinur ........................ F24F 7/06 454/238
2022/0333814 A1 * 10/2022 Sakal .................... F24F 13/029

FOREIGN PATENT DOCUMENTS

CN 216242369 U * 4/2022
DE 102005059023 A1 * 6/2007 ........... B08B 9/0551

OTHER PUBLICATIONS

English translation of CN-216242369. (Year: 2022).*
English translation of DE 102005059023. (Year: 2007).*

* cited by examiner

*Primary Examiner* — Thanh Luu
(74) *Attorney, Agent, or Firm* — Ballard Spahr LLP

(57) ABSTRACT

The disclosure relates to a system for visually detecting projectiles to thereby confirm that the projectiles are not trapped in a conduit. The system includes a housing defining an inlet. A trap is positioned within the housing. The trap is moveable about and between a catching configuration and a releasing configuration. An actuator is configured to move the trap about and between the catching configuration and the releasing configuration. The housing has a window that permits visual detection of the trap from a position outside of the housing.

19 Claims, 10 Drawing Sheets

DEVICES, SYSTEMS, AND METHODS FOR CATCHING PROJECTILES

FIELD

The disclosure relates to devices, systems, and methods for catching projectiles. The disclosed devices and systems can be used for catching projectiles that have passed through a conduit such as a hydraulic hose. The disclosed devices and systems can provide optical confirmation that a projectile has passed through the conduit, indicating that the projectile is not stuck within the hose. Methods of using the devices and systems for catching projectiles are also provided.

BACKGROUND

A standard test for a conduit, such as a hydraulic hose, to confirm that the hose does not have any partial or complete blockages that would inhibit flow therethrough includes firing a pellet therethrough. If the pellet passes through the conduit, the conduit passes the test; if the pellet does not exit the conduit, the conduit fails the test. Typically, an operator watches to confirm whether the pellet has passed through the conduit and then handles the test pellet. Accordingly, the test is labor intensive. Some automated systems have been introduced, but they are unreliable.

It is therefore desirable to provide way of reducing the amount of labor required to perform the test while maintaining reliability.

SUMMARY OF EMBODIMENTS

The disclosure relates to systems and methods for visually detecting projectiles to thereby confirm that the projectiles are not trapped in a conduit.

In one aspect, a system includes a housing defining an inlet. A trap is positioned within the housing. The trap is moveable about and between a catching configuration and a releasing configuration. An actuator is configured to move the trap about and between the catching configuration and the releasing configuration. The housing has a window that permits visual detection of the trap from a position outside of the housing.

In another aspect, a method includes coupling a first end of a conduit to a projectile launcher; positioning a second end of the conduit at the inlet of the housing; and propelling, using the projectile launcher, a pellet through the conduit.

BRIEF DESCRIPTION OF DRAWINGS

The invention will now be described, by way of example, with reference to the accompanying drawings in which.

DETAILED DESCRIPTION OF EMBODIMENTS

Figure 1:
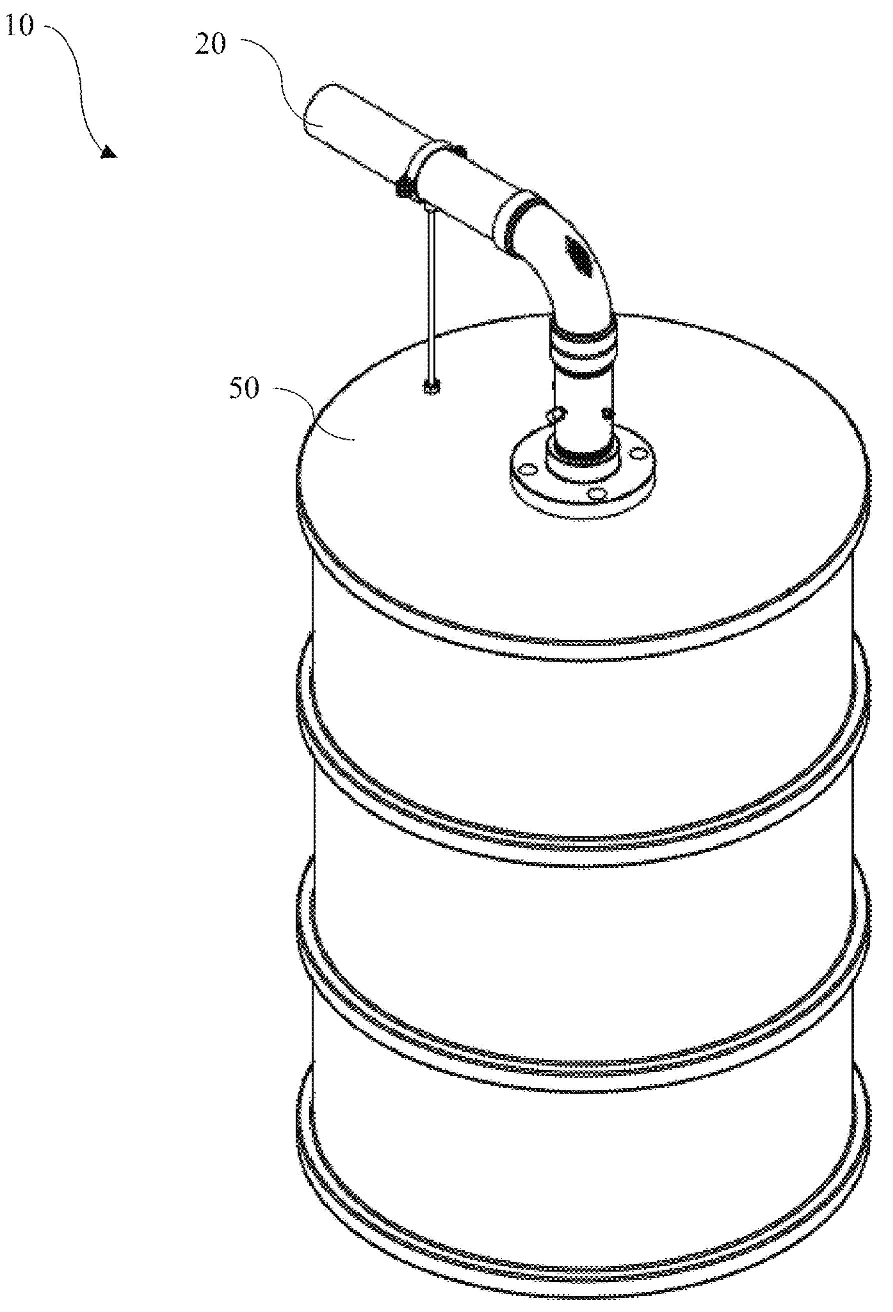
FIG. 1 is a perspective view of an exemplary system for visually detecting projectiles as disclosed herein.

Before the present systems and methods are described, it is to be understood that the present disclosure is not limited to the particular processes, compositions, or methodologies described, as these may vary. It is also to be understood that the terminology used in the description is for the purposes of describing the particular versions or embodiments only, and is not intended to limit the scope of the present disclosure. Unless defined otherwise, all technical and scientific terms used herein have the same meanings as commonly understood by one of ordinary skill in the art. Although any methods and materials similar or equivalent to those described herein can be used in the practice or testing of embodiments of the present disclosure, the methods, devices, and materials in some embodiments are now described. All publications mentioned herein are incorporated by reference in their entirety. Nothing herein is to be construed as an admission that the present disclosure is not entitled to antedate such disclosure by virtue of prior invention.

Definitions

Unless otherwise defined herein, scientific and technical terms used in connection with the present disclosure shall have the meanings that are commonly understood by those of ordinary skill in the art. The meaning and scope of the terms should be clear. However, in the event of any latent ambiguity, definitions provided herein take precedent over any dictionary or extrinsic definition. Further, unless otherwise required by context, singular terms shall include pluralities and plural terms shall include the singular.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above unless context dictates otherwise. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, "either," "one of," "only one of," or "exactly one of." "Consisting essentially of," when used in the claims, shall have its ordinary meaning as used in the field of patent law.

The term "about" is used herein to mean within the typical ranges of tolerances in the art. For example, "about" can be understood as about 2 standard deviations from the mean. According to certain embodiments, when referring to a measurable value such as an amount and the like, "about" is meant to encompass variations of ±20%, ±10%, ±5%, ±1%, ±0.9%, ±0.8%, ±0.7%, ±0.6%, ±0.5%, ±0.4%, ±0.3%, ±0.2% or ±0.1% from the specified value as such variations are appropriate to perform the disclosed methods. When "about" is present before a series of numbers or a range, it is understood that "about" can modify each of the numbers in the series or range.

The term "at least" prior to a number or series of numbers (e.g. "at least two") is understood to include the number adjacent to the term "at least," and all subsequent numbers or integers that could logically be included, as clear from context. When "at least" is present before a series of numbers or a range, it is understood that "at least" can modify each of the numbers in the series or range. Ranges provided herein are understood to include all individual integer values and all subranges within the ranges.

As used herein, the terms "comprising" (and any form of comprising, such as "comprise," "comprises," and "comprised"), "having" (and any form of having, such as "have" and "has"), "including" (and any form of including, such as "includes" and "include"), or "containing" (and any form of containing, such as "contains" and "contain"), are inclusive or open-ended and do not exclude additional, unrecited elements or method steps.

As described herein, a "magnetic material" should be understood to include both one or more magnets and a material that is configured to magnetize in the presence of a magnet to thereby cause a magnetic attraction to said magnet. In various optional aspects, the magnet(s) can comprise one or more rare earth magnets, one or more ferrite magnets, one or more flexible magnets, or any other suitable magnet type (e.g., permanent magnets). The magnetic material that is configured to magnetize in the presence of a magnet can include, for example, a ferromagnetic material.

Systems

Figure 2:
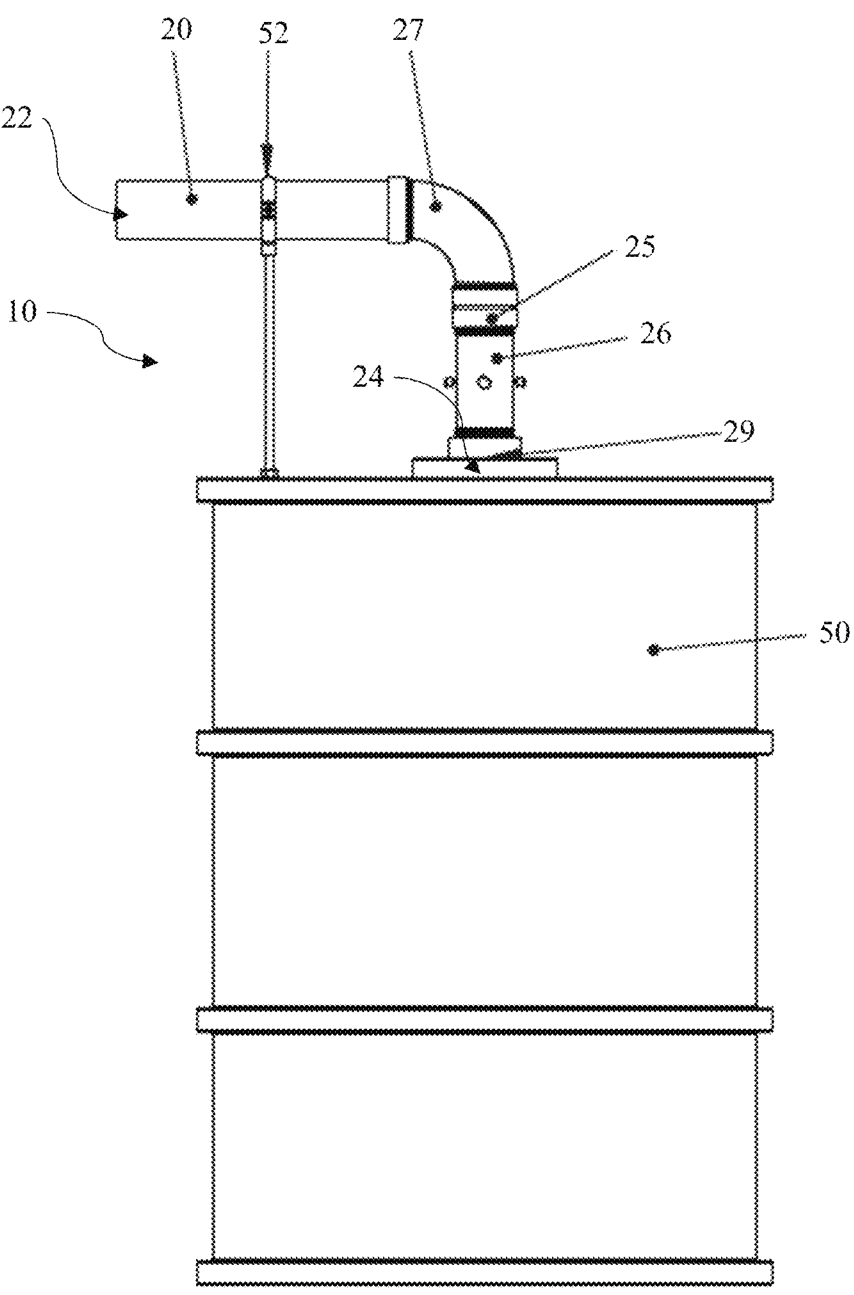
FIG. 2 is a side view of the exemplary system of FIG. 1.

Referring to FIGS. 1-2, the disclosure relates to a system 10 for detecting whether a projectile has passed through a conduit such as, for example, a hose. (As used herein, the terms "pellet" and "projectile" are interchangeably used. However, in alternative aspects, the projectile need not be a pellet.) For example, the system 10 can be used to perform a test including firing a pellet into the conduit and determining if the pellet passed through the conduit. This test can permit detecting defects such as a blockage within the interior of the conduit. In further aspects, a pellet or other projectile can be used to clean the conduit.

Figure 6:
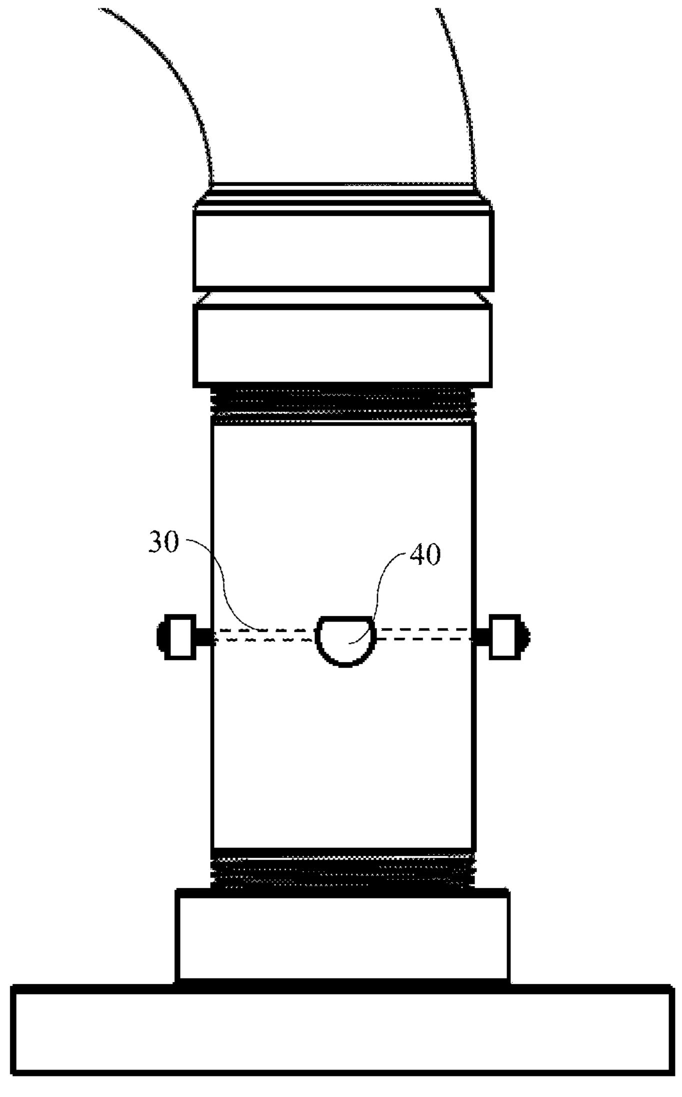
FIG. 6 is a partial side view of the housing and the trap as in FIG. 3, with the trap in a catching configuration.
Figure 7:
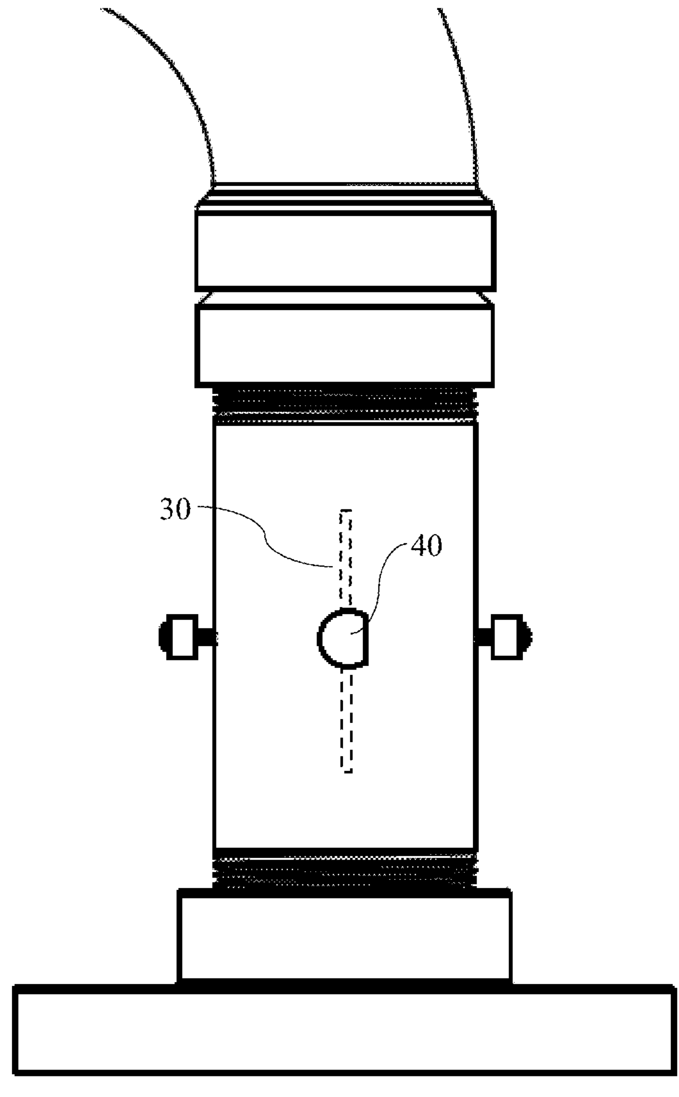
FIG. 7 is a partial side view of the housing and the trap as in FIG. 3, with the trap in a releasing configuration.

The system 10 comprises a housing 20 defining an inlet 22. A trap 30 can be positioned within the housing 20. The trap 30 can be moveable about and between a catching configuration (FIG. 6) and a releasing configuration (FIG. 7). When the trap 30 is in the catching configuration, a pellet cannot pass by the trap and is caught by the trap as it passes through the housing 20. When the trap is in the releasing configuration, the pellet can pass by the trap.

The housing 20 can comprise a window 26 that permits visual detection of the trap 30 from a position outside of the housing. Accordingly, the window 26 can permit an operator to visually detect the presence or absence of a pellet trapped by the trap 30. An actuator 40 can be configured to move the trap 30 about and between the catching configuration and the releasing configuration. For example, after detecting the presence of the pellet trapped by the trap 30, the actuator 40 can be actuated to clear the trap 30 to prepare the system for a subsequent test.

In some aspects, the housing 20 can comprise a tubular structure. For example, in these aspects, the housing 20 can comprise cylindrical tubing 25. In other aspects, the housing 20 can comprise rectangular tubing (i.e., having square or rectangular cross sections). In some optional aspects the window 26 can comprise a transparent tube. For example, the tubular structure can comprise at least one transparent tube segment. In some optional aspects, the housing 20 can comprise an elbow 27 positioned between the inlet 22 and the outlet 24. For example, a first portion of the housing can extend along a horizontal axis (optionally, parallel to the horizontal axis), and a second portion can extend downwardly (optionally, parallel to a vertical axis), with the elbow between the first and second segments. In this way, gravity can permit the pellet to drop from the trap when the trap is moved to the releasing configuration. The housing 20 can extend along and define a projectile path of travel. In some optional aspects, the housing 20 can have a major cross sectional dimension (e.g., diameter) of at least 2 inches perpendicular to the pellet path of travel. In some optional aspects, the housing 20 can have a major cross sectional dimension (e.g., diameter) of at least 3 inches.

Figure 9:
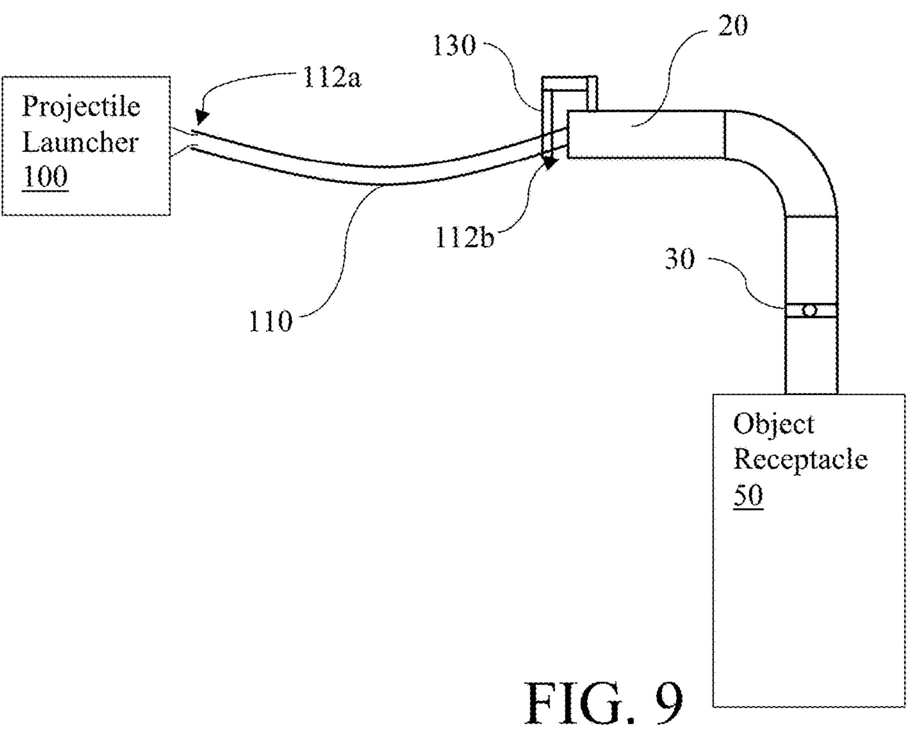
FIG. 9 is a schematic diagram of an exemplary system for visually detecting projectiles as disclosed herein.

Referring to FIG. 9, in some aspects, the system 10 can comprise a retainer that secures or otherwise supports a conduit 110 so that an end 112*b* is in communication with the inlet 22 of the housing 22. For example, the retainer can comprise a clamp 130. In other aspects, the retainer can comprise a hook, a strap, a fastener, an adhesive, or any suitable structure for securing or otherwise supporting the conduit 110 relative to the housing 20.

Figure 3:
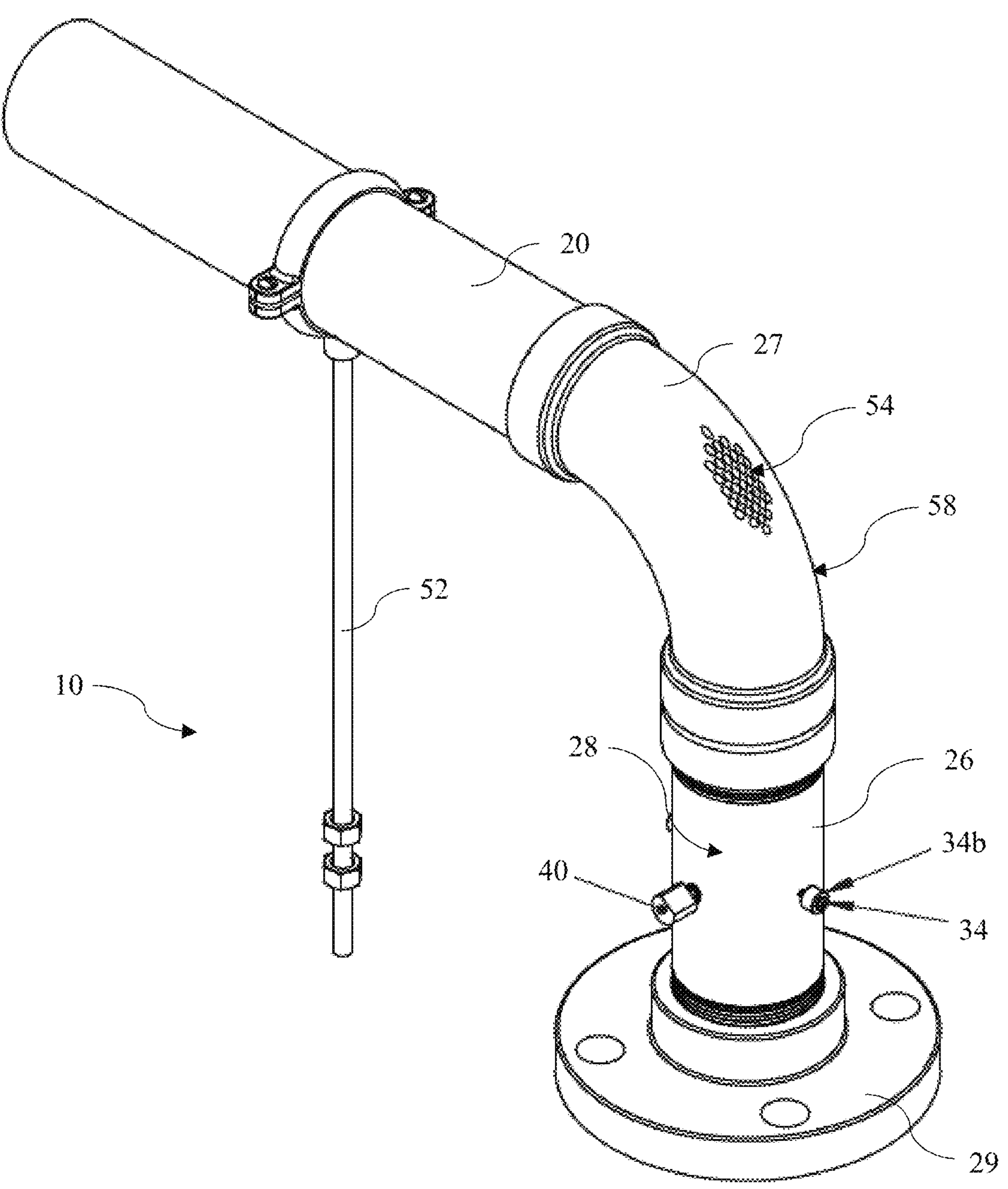
FIG. 3 is a perspective view of a housing and a trap of the exemplary system of FIG. 1.
Figure 4:
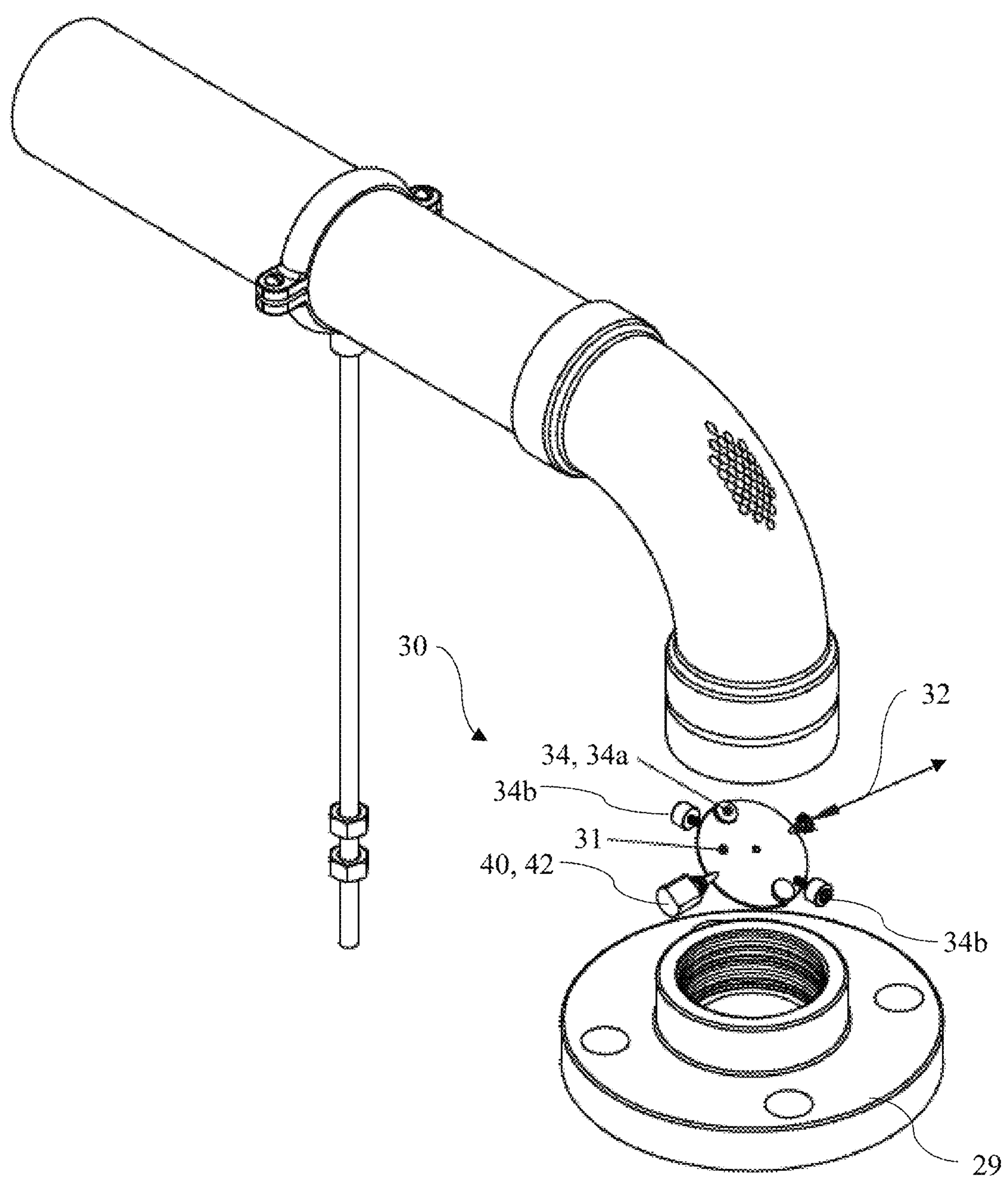
FIG. 4 is a perspective view of the housing and the trap of the exemplary system of FIG. 1, with a portion of the housing removed to see internal components.

In some aspects, and as illustrated in FIGS. 3-4, the trap 30 can be pivotable about a pivot axis 32 about and between the catching configuration (FIG. 6) and the releasing configuration (FIG. 7). The housing 20 can define an interior 28 through which the pellet travels. Optionally, the pivot axis 32 can extend through the interior 28 of the housing 20. In some aspects, the trap 30 can be able to rotate 360 degrees about the pivotal axis. For example, it is contemplated that the trap 30 can be rotated (e.g., spun) about the axis 32 to release a pellet. In other aspects, rotation of the trap 30 can be inhibited past a rotational threshold. For example, in these aspects, rotation of the trap 30 can be limited to about a 90 degree pivot.

Figure 5:
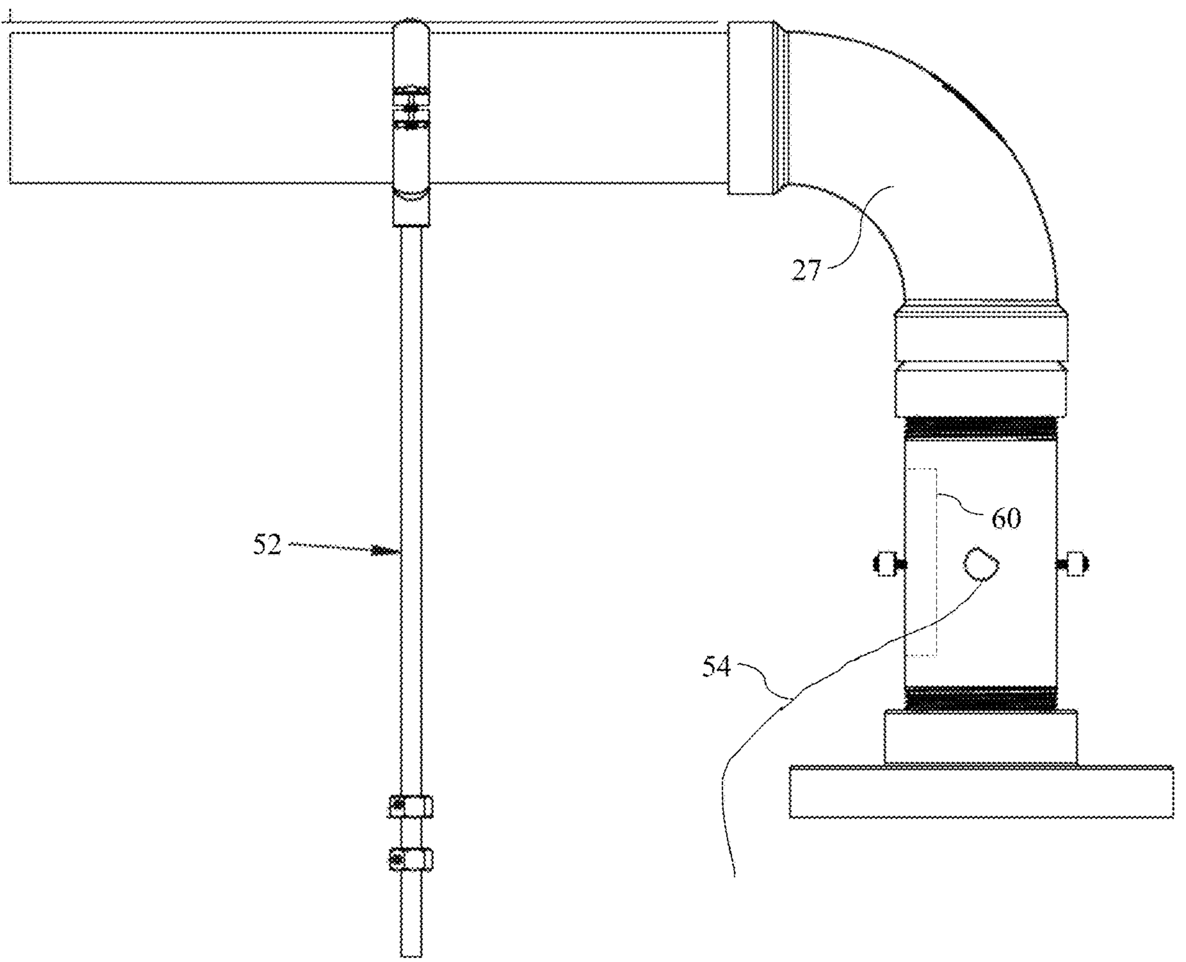
FIG. 5 is a side view of a housing and a trap as in FIG. 3.

Referring to FIGS. 3-5, in some aspects, the system 10 can comprise at least one magnet 34 that is configured to retain the trap in the catching configuration. In further aspects, the at least one magnet 34 can urge the trap 30 to return to the catching configuration. In this way, once the trap 30 is moved to release a pellet from the trap, the trap can then be reset to the catching configuration in preparation for catching the next pellet. In some aspects, the at least one magnet 34 can comprise a first magnet 34*a* that is coupled to the trap 30 and a second magnet 34*b* that is coupled to the housing 20. In still further aspects, the system 10 can comprise one or a pair of first magnets 34*a* that are coupled to the trap 30 and a pair of second magnets 34*b* that are coupled to the housing 20. The pair of first magnets 34*a* can be positioned on opposite sides of the trap (e.g., along an axis 12 that is perpendicular to the rotational axis 32 of the trap 30). The pair of second magnets 34*b* can be positioned on opposite sides of the housing along the same axis 12 so that when the trap 30 is in the catching configuration, each magnet 34*a* of the first pair is positioned proximate to a respective magnet 24*b* of the second pair of magnets.

In other aspects, any combination of magnets and magnetizable material (e.g., ferromagnetic material that is configured to magnetize in the presence of magnets) that cooperate to attractively retain the trap 30 in the catching configuration can be used. Accordingly, the magnet(s) 34 and magnetic material can be positioned on the housing 20 and on the trap 30 so that the magnets cooperate to attractively retain the trap 30 in the catching configuration. For example, in some aspects, a magnet can be coupled to the housing, and a magnetizable material can be coupled to the trap 30 in respective positions so that the magnet and magnetic material are proximate to each other when the trap is in the catching configuration. In other aspects, a magnetizable material can be coupled to the housing, and a magnet can be coupled to the trap 30 in respective positions so that the magnet and magnetic material are proximate to each other when the trap is in the catching configuration.

In aspects in which the trap 30 can be rotated (e.g., spun) about the axis 32 to release a pellet, the at least one magnet 34 can stop the trap 30 from rotation in the catching configuration. In some aspects, the magnets 34 can be secured to the housing and/or the trap 30 via fasteners 35 (e.g., screws or bolts).

In some aspects, the trap 30 can be configured to permit gas to pass thereby. In this way, gas that drives the pellet through the conduit can be permitted to pass by the trap (with the trap in the catching configuration) while the pellet can be trapped. For example, in some embodiments, the trap 30 can comprise a screen. In other aspects, the trap 30 can comprise a plate 31. In some optional aspects, the screen or the plate can be disc-shaped. For example, the disc-shaped screen or plate that generally corresponds to the cross-sectional shape of the interior 28 of the housing at the trap. In some aspects, the trap 30 can comprise one or a plurality of perforations. For example, in some aspects, the one or plurality of perforations can be formed through the trap 30. In other aspects, the trap can comprise a screen or mesh that defines the plurality of perforations. In other aspects, the housing 20 and the trap 30 can cooperate to permit gas to pass by the trap with the trap in the catching configuration. For example, the trap 30 and the housing 20 can define a gap therebetween that can permit gas to pass by the trap with the trap in the catching configuration. Optionally, in these aspects, the gap can be defined between an interior surface of the housing 20 and the outer periphery of the trap 30.

In additional or alternative aspects, and referring to FIG. 3, the housing 20 can have an outer surface 58. In some aspects, the housing 20 can define one or a plurality of perforations 54 along the circumferential surface. The one or a plurality of perforations 54 can permit gas to exhaust from the interior of the housing 20. The one or a plurality of perforations 54 can be sized to inhibit the pellet from passing therethrough. In some optional aspects, the one or a plurality of perforations 54 can be positioned in or after the elbow 27 (where provided). In this way, the gas can be exhausted in a position along the path of the pellet after the pellet no longer needs the gas to carry the pellet through the housing 20.

Referring to FIG. 1, in some aspects, the system can comprise an object receptacle 50. The object receptacle 40 can be, for example, a drum. In other aspects, the object receptacle 50 can be a bin, a box, a cage, a bucket, or any suitable receptacle. The object receptacle 50 can be configured to catch and hold pellets. The housing 20 can comprise an outlet 24 in communication with the object receptacle 50. For example, the housing 20 can comprise a flange 29 that couples to the object receptacle 50.

In some aspects, the object receptacle 50 can comprise at least one exhaust outlet that permits gas to pass therethrough. In this way, gas that drives the pellet through the conduit can be permitted to pass from the object receptacle 50 while retaining the pellet within the object receptacle. For example, in some aspects, the at least one exhaust outlet comprises a plurality of openings. Each opening can have a major dimension that is less than a predetermined dimension. For example, in some aspects, the openings can have a major dimension that is less about 1 cm, or less than about ½ cm. In this way, the openings can be sized to inhibit pellets from escaping therethrough.

In some aspects, a support element 52 can support at least a portion of the housing 20. For example, the support element 52 can comprise a strut that couples to the object receptacle 50.

In some aspects, the system 10 can comprise a conductor 56 (FIG. 5) in communication with the trap 30 and/or the housing 20. The conductor 56 can be configured to dissipate electrostatic energy to a ground. For example, it is contemplated that the pellet can accumulate static electricity as it travels through the conduit. The conductor 56 can dissipate at least a portion of the static electricity to inhibit the pellet from electrostatically adhering to the housing 20 or the trap 30. The conductor 56 can be a wire or any suitable electrical conductor.

In some aspects, the housing 20 can comprise an access door 60 (shown in broken lines in FIG. 5) proximate to the trap 30. The access door 60 can permit a user to access the trap 30 from a position exterior to the housing 20. In this way, an operator can clear any stuck pellet or refuse from the trap 30 as well as service the trap for any maintenance.

In some aspects, the actuator 40 can comprise a knob coupled to the trap 30. For example, in some aspects, the actuator 40 can comprise a pair of knobs 42 coupled to the trap and positioned on opposite sides of the housing 20. An operator can use one or more of the knobs 42 to rotate (optionally, spin) the trap 30 to release a pellet after confirming that the pellet was caught in the trap.

Figures 8A, 8B:
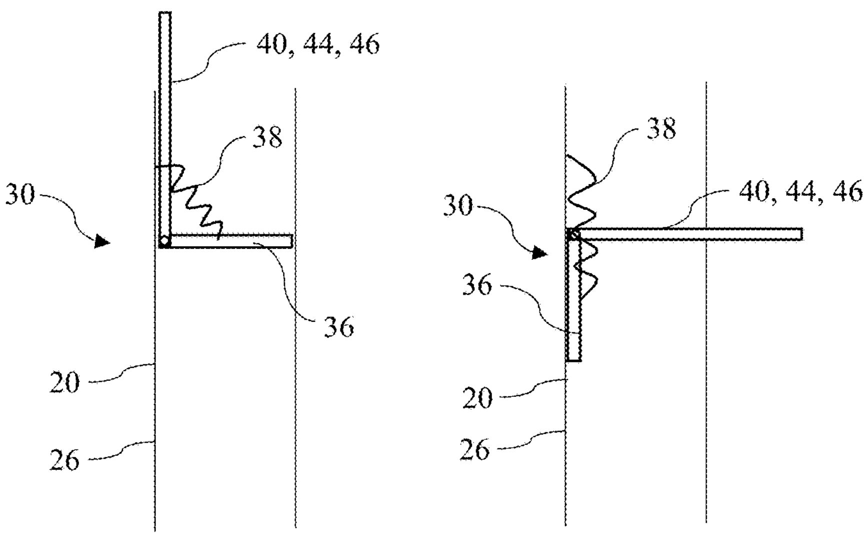
FIG. 8A is a schematic drawing an exemplary trap of a system as disclosed herein, with the trap in a releasing configuration.
FIG. 8B is a schematic drawing the exemplary trap of FIG. 8A, with the trap in a releasing configuration.

Referring to FIGS. 8A and 8B, in other aspects, the trap can comprise a hinged door 36. In some aspects, the actuator 40 can comprise a lever 44. In further aspects, the actuator can comprise a handle 46. In exemplary aspects, the trap 30 can be spring-biased (e.g., via a spring 38) toward the catching configuration. In some optional aspects, the trap 20 can comprise a pair of hinged doors.

In further aspects, the trap 30 can comprise a slidable gate. For example, the slidable gate can slide along a track. In other aspects, the trap 30 can comprise an iris.

Referring to FIG. 9, the system 10 can further comprise a projectile launcher 100. The projectile launcher 100 can use compressed gas from a compressed gas source to fire the pellet into a conduit 110 (e.g., tubing, such as, for example, hydraulic or pneumatic tubing). The projectile launcher 100 can be comprise a nozzle that is configured to be inserted into a first end 112*a* of the conduit 110. An opposed second end 112*b* of the conduit 110 can be inserted into, or otherwise coupled to, the housing 20. For example, the clamp 130 can secure the second end 112*b* to the housing 20 so that the second end of the conduit 110 is in communication with the inlet 22 of the housing. Optionally, the first end 112*a* of the conduit 110 can be coupled to the projectile launcher 100. In other aspects, the conduit 110 need not be coupled to the projectile launcher 100. Optionally, the second end 112*b* of the conduit 110 can be coupled to the housing 20. In other aspects, the conduit 110 need not be coupled to the housing 20.

In some aspects, the system 10 can be operated without need for any computing device. For example, an operator can visually inspect the trap 30 and operate the actuator 40 to release the pellet. In other aspects, and with reference to FIG. 10, the system 10 can comprise an optical sensor 120 that is positioned to detect, through the window 26, the presence or absence of an object trapped in the trap. For example, the optical sensor 120 can comprise a laser 122 and an optical detector 124 that is configured to detect emission from the laser. The laser and optical detector 124 can be positioned so that, when the pellet is trapped in the trap, the pellet blocks emission of light from the laser 122 to the optical detector 124. The absence of detected light from the laser 122 can, therefore, correspond to detection of the pellet in the trap. In other aspects, other optical sensor 120 are contemplated, such as a motion sensor or an optical range detector.

The system 10 can further comprise a computing device 1001 that is in communication with the optical sensor 120. In some aspects, the computing device 1001 can be configured to cause, upon receipt of a signal from the optical detector detecting the presence of the object trapped in the trap, the actuator 40 to move the trap to the releasing configuration. For example, the actuator can comprise a motor, a pneumatic actuator, or a solenoid in communication with the computing device 1001.

In further aspects, the projectile launcher 1001 can be in communication with the computing device 1001. In these aspects, the computing device 100 can be configured to initiate an alarm upon detecting an absence of the object trapped in the trap for a predetermined duration from operation of the pneumatic pellet launcher. For example, in some aspects, projectile launcher 1001 can send a signal to the computing device 1001 that a pellet has been fired, and the computing device can initiate a timer. Upon expiration of the timer, if the optical sensor 120 does not detect a pellet, the computing device 1001 can initiate the alarm (e.g., providing an error notification to an operator, turning on an audible or visual alarm, or preventing advancement of a test until an operator clears the alarm). In other aspects, the computing device can cause the pneumatic pellet launcher 100 to fire the projectile and initiate the timer based on a time at which the computing device caused the pneumatic pellet launcher 100 to fire the projectile.

Method

A method of using the system 10 can comprise coupling a first end of a conduit to a projectile launcher and positioning a second end of the conduit at the inlet of the housing. A pellet can be propelled through the conduit.

The method can further comprise activating movement of the actuator to move the trap to the releasing configuration upon visually detecting the pellet being trapped in the trap. In aspects in which the actuator comprises a knob coupled to the trap, the knob can be spun to rotate the trap. In some aspects, a determination that the pellet is stuck within the hose can be made by visual inspection of the trap.

In some aspects, visually detecting the presence or absence of a pellet being trapped in the trap can be performed by an operator. In other aspects, visually detecting the presence or absence of a pellet being trapped in the trap can be performed by an optical sensor 120.

In aspects in which the system comprises an object receptacle 40. One or more pellets can be returned from the object receptacle 40 to the projectile launcher 100 for reuse.

In aspects in which the housing 20 comprises an access door 60 proximate to the trap 30, the access door can be opened, and a stuck pellet can be cleared from the housing 20.

Computing Device

Figure 10:
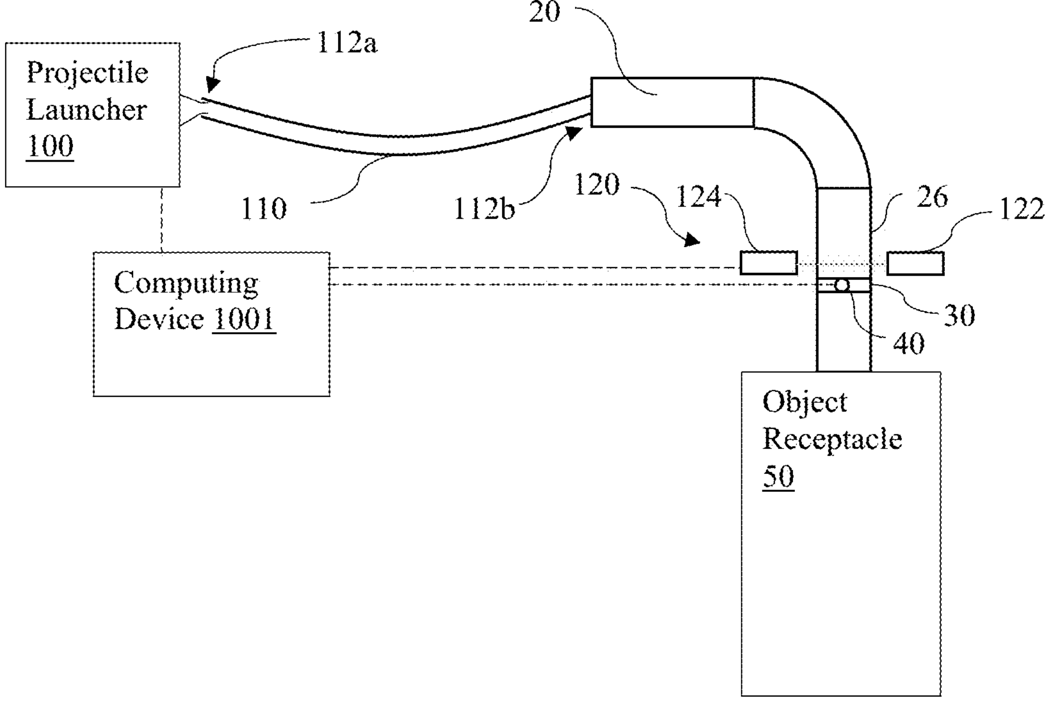
FIG. 10 is a schematic diagram of an exemplary system for visually detecting projectiles as disclosed herein.
Figure 11:
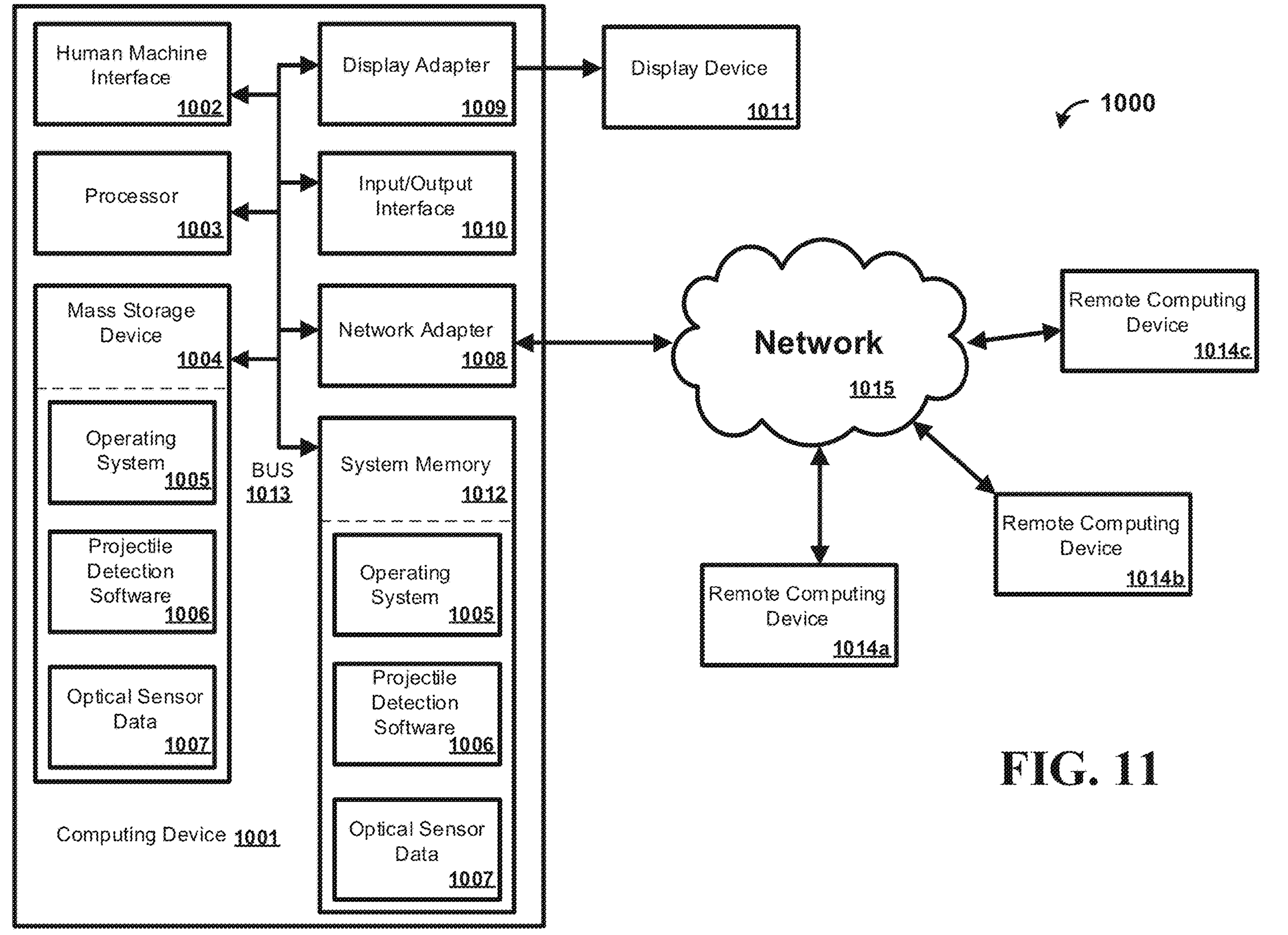
FIG. 11 is a block diagram of an exemplary computing system comprising a computing device as disclosed herein.

FIG. 11 shows an exemplary computing system 1000 including an exemplary configuration of a computing device 1001 that can be used with the system 10 (FIG. 10). The computing device 1001 can be configured to receive data such as, but not limited to, sensor data from the optical sensor 120 (FIG. 10).

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as, but not limited to read only memory (ROM).

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and projectile detection software 1006 may be stored on the mass storage device 1004. One or more of the operating system 1005 and/or projectile detection software 1006 (or some combination thereof) may comprise program modules and the projectile detection software 1006. Optical sensor data 1007 may also be stored on the mass storage device 1004. The optical sensor data 1007 may be stored in any of one or more databases known in the art. The databases may be centralized or distributed across multiple locations within the network 1015.

In some aspects, the computing device 1001 (server) may be a cloud-based or web-based server without departing from a broader scope of the present disclosure. In some aspects, the remote computing device 1014 may include an implementation of a client instance of the computing device 1001. As such, a user may interact with the computing device 1001 through the remote computing device 1014, e.g., the client instance implemented therein. In some aspects, the remote computing device 1014 may include processors, memory, display interfaces/devices, other output devices, sensors, features of the measuring device, etc., without departing from a broader scope of the present disclosure.

In some aspects, a user may enter commands and information into the computing device 1001 using an input device. Such input devices comprise, but are not limited to, a joystick, a touchscreen display, a keyboard, a pointing device (e.g., a computer mouse, remote control), a microphone, a scanner, tactile input devices such as gloves, and other body coverings, motion sensor, speech recognition, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. In some aspects, any appropriate output from the computing device 1001 may be transmitted to the second computing device 30 and/or the remote computing device 1014 for presentation to a user via the client instance of the computing device 1001. Such output may be any form of visual representation, including, but not limited to, textual, graphical, animation, audio, tactile, and the like. The display device 1011 and computing device 1001 may be part of one device, or separate devices.

The computing device 1001 may operate in a networked environment using logical connections to one or more remote computing devices 1014*a,b,c*. The other remote computing devices 1014*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, or other common network node, and so on. Logical connections between the computing device 1001 and the remote computing devices may be made using a network 1015, such as a local area network (LAN) and/or a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices can optionally have some or all of the components disclosed as being part of computing device 1001. In various further aspects, it is contemplated that some or all aspects of data processing described herein can be performed via cloud computing on one or more servers or other remote computing devices 1014. Accordingly, at least a portion of the system 1000 can be configured with internet connectivity.

It should be noted that, the above embodiments are only intended for describing the present disclosure, and should not be interpreted as limitation to the technical solutions of the present disclosure. Although the present disclosure is described in detail in conjunction with the above embodiments, it should be understood by the skilled in the art that, modifications or equivalent substitutions may still be made to the present disclosure by those skilled in the art; and any technical solutions and improvements thereof without departing from the spirit and scope of the present disclosure also fall into the scope of the present disclosure defined by the claims.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system comprising:

a housing defining an inlet;

a trap positioned within the housing, the trap moveable about and between a catching configuration and a releasing configuration; and an actuator that is configured to move the trap about and between the catching configuration and the releasing configuration, wherein the housing comprises a window that permits visual detection of the trap from a position outside of the housing.

Aspect 2: The system of aspect 1, wherein the trap is pivotable about a pivot axis about and between the catching configuration and the releasing configuration.

Aspect 3: The system of aspect 2, wherein the housing defines an interior, wherein the pivot axis extends through the interior of the housing.

Aspect 4: The system of aspect 2 or aspect 3, wherein the trap is rotatable about 360 degrees about the pivotal axis.

Aspect 5: The system of any one of the preceding aspects, further comprising at least one magnet that is configured to retain the trap in the catching configuration.

Aspect 6: The system of aspect 5, wherein the at least one magnet comprises at least one first magnet that is coupled to the trap and at least one second magnet that is coupled to the housing.

Aspect 7: The system of aspect 6, wherein the at least one first magnet comprises a first pair of magnets that are positioned on opposite sides of the trap, wherein the at least one second magnet comprises a second pair of magnets that are positioned on opposite sides of the housing so that when the trap is in the catching configuration, each magnet of the first pair is positioned proximate to a respective magnet of the second pair of magnets.

Aspect 8: The system of any one of the preceding aspects, wherein the trap comprises a screen or a plate.

Aspect 9: The system of aspect 8, wherein the plate is disc shaped.

Aspect 10: The system of any one of the preceding aspects, wherein the trap comprises one or a plurality of perforations to permit air flow therethrough when the trap is in the catching configuration.

Aspect 11: The system of any one of the preceding aspects, further comprising an object receptacle, wherein the housing comprises an outlet in communication with the object receptacle.

Aspect 12: The system of aspect 11, wherein the object receptacle comprises at least one exhaust outlet that permits gas to pass therethrough.

Aspect 13: The system of aspect 12, wherein the at least one exhaust outlet comprises a plurality of openings, each opening having a major dimension that is less than about 1 cm.

Aspect 14: The system of any one of aspects 11-13, wherein the object receptacle comprises a drum.

Aspect 15: The system of any one of the preceding aspects, wherein the housing comprises a tubular structure.

Aspect 16: The system of any one of aspects 12-15, wherein the window comprises a transparent tube.

Aspect 17: The system of any one of the preceding aspects, wherein the housing comprises:

an outlet; and an elbow positioned between the inlet and the outlet.

Aspect 18: The system of aspect 16, wherein the housing comprises cylindrical tubing.

Aspect 18: The system of aspect 16, wherein the housing comprises rectangular tubing.

Aspect 20: The system of any one of the preceding aspects, wherein the housing has a major cross sectional dimension of at least about 3 inches.

Aspect 21: The system of any one of the preceding aspects, further comprising a conductor in electrical communication with the trap and configured to dissipate electrostatic energy to a ground.

Aspect 222: The system of any one of the preceding aspects, wherein the housing comprises an access door proximate to the trap, wherein the access door permits a user to access the trap from a position exterior to the housing.

Aspect 23: The system of any one of the preceding aspects, wherein the housing has an interior and an outer surface, wherein the housing defines one or a plurality of perforations extending from the interior to the outer surface.

Aspect 24: The system of any one of the preceding aspects, wherein the actuator comprises a knob coupled to the trap.

Aspect 25: The system of aspect 24, wherein the actuator comprises a pair of knobs coupled to the trap and positioned on opposite sides of the housing.

Aspect 26: The system of any one of the preceding aspects, wherein the trap comprises a hinged door.

Aspect 27: The system of aspect 26, wherein the trap comprises a pair of hinged doors.

Aspect 28: The system of any one of the preceding aspects, wherein the trap comprises a slidable gate.

Aspect 29: The system of any one of the preceding aspects, wherein the trap comprises an iris.

Aspect 30: The system of any one of the preceding aspects, wherein the actuator comprises a lever.

Aspect 31: The system of any one of the preceding aspects, wherein the trap is spring-biased toward the catching configuration.

Aspect 32: The system of any one of the preceding aspects, wherein the actuator comprises a handle.

Aspect 33: The system of aspect 1, further comprising a projectile launcher.

Aspect 34: The system of any one of the preceding aspects, further comprising an optical sensor positioned to detect, through the window, the presence or absence of an object trapped in the trap.

Aspect 35: The system of aspect 34, further comprising a computing device in communication with the optical sensor and the actuator, wherein the computing device is configured to cause, upon receipt of a signal from the optical detector detecting the presence of the object trapped in the trap, the actuator to move the trap to the releasing configuration.

Aspect 36: The system of aspect 35, wherein the actuator comprises a motor or a solenoid.

Aspect 37: The system of aspect 35, further comprising a projectile launcher in communication with the computing device, wherein the computing device is configured to initiate an alarm upon detecting an absence of the object trapped in the trap for a predetermined duration from operation of the projectile launcher.

Aspect 38: A method of using the system of any one of the preceding aspects, the method comprising:

coupling a first end of a conduit to a projectile launcher;

positioning a second end of the conduit at the inlet of the housing; and propelling, using the projectile launcher, a pellet through the conduit.

Aspect 39: The method of aspect 38, further comprising activating movement of the actuator to move the trap to the releasing configuration upon visually detecting the pellet being trapped in the trap.

Aspect 40: The method of aspect 38 or aspect 39, wherein the actuator comprises a knob coupled to the trap; and wherein activating movement of the actuator comprises spinning the knob to rotate the trap.

Aspect 41: The method of any one of aspects 38-40, wherein the trap is configured to automatically return to the catching configuration if the trap is positioned in the releasing configuration.

Aspect 42: The method of any one of aspects 38-41, further comprising a step of determining whether the pellet is stuck within the hose by visual inspection of the trap.

Aspect 43: The method of any one of aspects 38-42, wherein the system further comprises an object receptacle, wherein the housing comprises an outlet in communication with the object receptacle, the method comprising returning at least one pellet from the object receptacle to the projectile launcher for reuse.

Aspect 44: The method of any one of aspects 38-43, wherein the housing comprises an access door proximate to the trap, wherein the access door permits a user to access the trap from a position exterior to the housing, the method further comprising:

opening the access door; and clearing a stuck pellet from the housing.

All referenced journal articles, patents, and other publications are incorporated by reference herein in their entireties.

What is claimed is:

1. A system comprising:

a housing defining an inlet;

a trap positioned within the housing, the trap moveable about and between a catching configuration and a releasing configuration, wherein:

in the catching configuration, the trap is configured to inhibit passage of a projectile thereby; and in the releasing configuration, the trap is configured to permit passage of the projectile thereby; and an actuator that is configured to move the trap about and between the catching configuration and the releasing configuration, wherein the actuator comprises a knob coupled to the trap, wherein the housing comprises a window that permits visual detection of the projectile being caught in the trap from a position outside of the housing.

2. The system of claim 1, wherein the trap is pivotable about a pivot axis about and between the catching configuration and the releasing configuration.

3. The system of claim 2, wherein the housing defines an interior, wherein the pivot axis extends through the interior of the housing.

4. The system of claim 2, wherein the trap is rotatable about 360 degrees about the pivotal axis.

5. The system of claim 1, further comprising at least one magnet that is configured to retain the trap in the catching configuration.

6. The system of claim 5, wherein the at least one magnet comprises at least one first magnet that is coupled to the trap and at least one second magnet that is coupled to the housing.

7. The system of claim 6, wherein the at least one first magnet comprises a first pair of magnets that are positioned on opposite sides of the trap, wherein the at least one second magnet comprises a second pair of magnets that are positioned on opposite sides of the housing so that when the trap is in the catching configuration, each magnet of the first pair is positioned proximate to a respective magnet of the second pair of magnets.

8. The system of claim 1, wherein the trap comprises a screen or a plate.

9. The system of claim 8, wherein the plate is disc shaped.

10. The system of claim 1 further comprising a projectile receptacle, wherein the housing comprises an outlet in communication with the projectile receptacle.

11. The system of claim 10, wherein the projectile receptacle comprises at least one exhaust outlet that permits gas to pass therethrough.

12. The system of claim 1, wherein the housing comprises a tubular structure.

13. The system of claim 1, wherein the housing comprises:

an outlet; and an elbow positioned between the inlet and the outlet.

14. The system of claim 1, wherein the housing has an interior and an outer surface, wherein the housing defines one or a plurality of perforations extending from the interior to the outer surface.

15. The system of claim 1 further comprising a projectile launcher.

16. A system comprising:

a housing defining an inlet;

a trap positioned within the housing, the trap moveable about and between a catching configuration and a releasing configuration, wherein:

in the catching configuration, the trap is configured to inhibit passage of a projectile thereby; and in the releasing configuration, the trap is configured to permit passage of the projectile thereby; and an actuator that is configured to move the trap about and between the catching configuration and the releasing configuration, wherein the housing comprises a window that permits visual detection of the projectile being caught in the trap from a position outside of the housing, wherein the housing comprises a tubular structure, and wherein the window comprises a transparent tube.

17. A system comprising:

a housing defining an inlet;

a trap positioned within the housing, the trap moveable about and between a catching configuration and a releasing configuration, wherein:

in the catching configuration, the trap is configured to inhibit passage of a projectile thereby; and in the releasing configuration, the trap is configured to permit passage of the projectile thereby, wherein the housing comprises a window that permits visual detection of the projectile being caught in the trap from a position outside of the housing;

an actuator that is configured to move the trap about and between the catching configuration and the releasing configuration;

an optical sensor positioned to detect, through the window, the presence or absence of the projectile trapped in the trap; and a computing device in communication with the optical sensor and the actuator, wherein the computing device is configured to cause, upon receipt of a signal from the optical detector detecting the presence of the projectile trapped in the trap, the actuator to move the trap to the releasing configuration.

18. The system of claim 17, wherein the actuator comprises a motor or a solenoid.

19. The system of claim 17, further comprising a projectile launcher in communication with the computing device, wherein the computing device is configured to initiate an alarm upon detecting an absence of the projectile trapped in the trap for a predetermined duration from operation of the projectile launcher.

* * * * *